United States Patent [19]

Takashiba et al.

[11] Patent Number: 5,410,564
[45] Date of Patent: Apr. 25, 1995

[54] DIRECT CURRENT ELECTRIC FURNACE FOR MELTING METAL

[75] Inventors: Nobuyoshi Takashiba; Koji Numata; Shunji Ohtsubo; Takahashi Kiyoshi; Yasuharu Miyazaki; Tadaaki Iwamura, all of Kurashiki, Japan

[73] Assignee: Kawasaki Steel Corporation, Hyogo, Japan

[21] Appl. No.: 776,235

[22] PCT Filed: Mar. 19, 1991

[86] PCT No.: PCT/JP91/00368

§ 371 Date: Nov. 11, 1991

§ 102(e) Date: Nov. 11, 1991

[87] PCT Pub. No.: WO91/14911

PCT Pub. Date: Oct. 3, 1991

[30] Foreign Application Priority Data

Mar. 19, 1990 [JP] Japan ................................ 2-66986
Dec. 12, 1990 [JP] Japan ................................ 2-401745

[51] Int. Cl.⁶ ............................................ H05B 7/00
[52] U.S. Cl. ............................. 373/102; 373/103; 373/105; 373/108; 373/72
[58] Field of Search ............... 373/102, 103, 104, 108, 373/47-49, 105, 72

[56] References Cited

U.S. PATENT DOCUMENTS

| 941,419 | 11/1909 | Keller | 373/72 |
| 3,619,464 | 11/1971 | Holzgruber | 373/105 |
| 3,757,021 | 9/1973 | Bockman | 373/104 |
| 3,789,127 | 1/1974 | Bowman | 373/104 |
| 3,949,151 | 4/1976 | Kerton | 373/108 |
| 4,277,638 | 7/1981 | Stenkuist | 373/72 |
| 4,435,812 | 3/1984 | Guido et al. | 373/72 |
| 4,606,055 | 8/1986 | Lassander et al. | 373/108 |
| 4,612,650 | 9/1986 | Stenkuist | 373/108 |
| 4,725,939 | 2/1988 | Boisdon | 373/108 |
| 4,730,338 | 3/1988 | Guido | 373/72 |
| 4,754,464 | 6/1988 | Feuerstake | 373/72 |
| 5,138,630 | 8/1992 | Suga | 373/107 |

FOREIGN PATENT DOCUMENTS

| 0275384 | 7/1988 | European Pat. Off. . |
| 2588432 | 4/1987 | France . |
| 2510326 | 9/1975 | Germany . |
| 55-65881 | 5/1980 | Japan . |
| 2302581 | 12/1990 | Japan . |

OTHER PUBLICATIONS

2302581 Dec. 14, 1990 Patent Abstracts of Japan, vol. 15, No. 81, M1086 25Fel.

Primary Examiner—Teresa J. Walberg
Assistant Examiner—Tu Hoang
Attorney, Agent, or Firm—Dvorak and Traub

[57] ABSTRACT

According to the present invention, there is provided a direct current electric furnace for melting metal capable of melting scraps rapidly and also capable of diminishing cold and hot spots formed on the furnace wall, wherein the direct current electric furnace is provided with a single top electrode, a plurality of furnace bottom electrodes, or a plurality of electrode units obtained by dividing a multitude of furnace bottom electrodes of a small diameter into plural units, and electric current controlling thyristor circuits for controlling each individually electric currents flowing through the plural furnace bottom electrodes or electrode units. The electric current controlling thyristor circuits may be substituted by thyristor circuits for controlling electric currents for each of plural groups obtained by dividing the above plural furnace bottom electrodes or the above many furnace bottom electrodes or the above plural electrode units into the plural groups.

12 Claims, 10 Drawing Sheets

DIRECT CURRENT ELECTRIC FURNACE FOR MELTING METAL

FIELD OF ART

The present invention relates to a direct current electric furnace having top and bottom electrodes for melting and refining metal using direct current arcs.

BACKGROUND ART

Electric furnaces are classified into alternating current electric furnaces and direct current electric furnaces. In an alternating current electric furnace, three graphite electrodes are inserted from above into the furnace to form arcs between those electrodes mainly through scraps or molten steel. In a direct current electric furnace, usually one graphite electrode is inserted into the furnace and direct current arcs are allowed to form between the graphite electrode and the furnace bottom as the other electrode.

In the former, since three AC electrodes are used, the upper structure of the furnace is complicated and three-phase arcs are deflected outwards by a mutual electromagnetic force, so that the quantity of radiant heat is large and the thermal efficiency is poor. Besides, the furnace wall is damaged locally due to the deflection of arc. Further, the wear of the electrodes is conspicuous, the noise is loud, and flicker is marked. On the other hand, in the latter, i.e., a DC electric furnace, the construction around the furnace top electrode is simple because the number of electrode used is generally small, and in comparison with an AC electric furnace, the decrease in unit consumption of the graphite electrode and in electric power unit consumption as well as the decrease of flicker can be expected. However, problems are encountered in the service life and safety of the furnace bottom electrode.

As stated in an article entitled "Chokuryu Kanetsuro No Genjyo To Shyorai" ("Present State and Future of DC Arc Furnaces") at page 24–33 of "Kogyo Kanetsu Ro" ("Industrial Heating Furnaces") Vol. 25 (1988), No. 2, published by Nippon Kogyo Ro Kyokai (Japan Industrial Furnace Association), as furnace bottom electrodes in DC electric furnaces there are known a small-diameter multi-electrode air-cooled type having a large number of small-diameter electrodes embedded upright in a refractory provided as a lining on the furnace bottoms and a large-diameter electrode water-cooled type having one to three round steel rods of a large diameter disposed upright in the furnace bottom.

Figure 6:
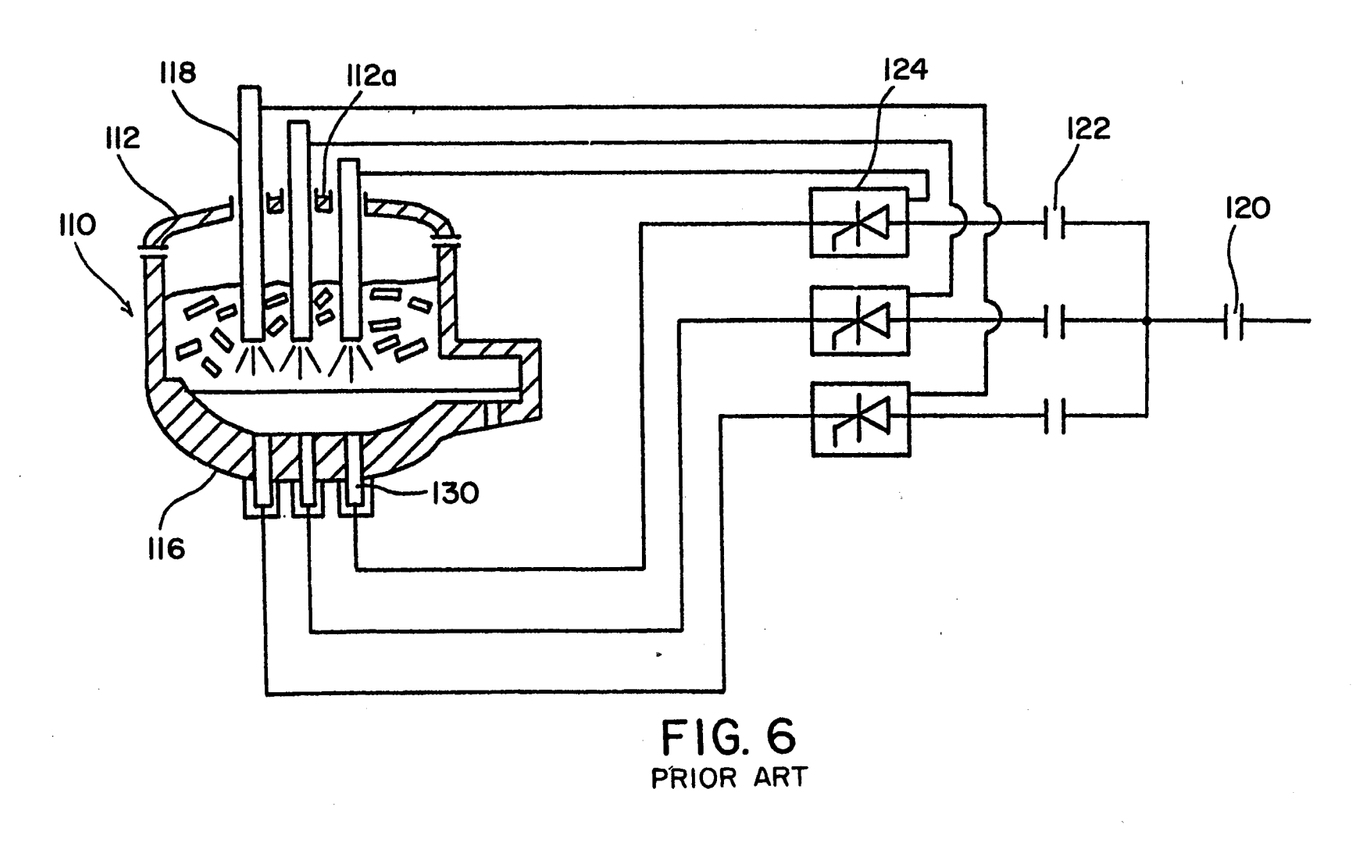
FIG. 6 is a schematic sectional view showing an entire arrangement of a conventional direct current electric furnace.

FIG. 6 shows an example of a conventional DC electric furnace of a large-diameter electrode type. In the same figure, three top electrodes 118 made of graphite are inserted into the furnace through a furnace lid 112, while in a furnace bottom 116 three water-cooled type bottom electrodes 130 constituted by steel rods are embedded upright in a molded refractory. The diameter of each bottom electrode 130 is about 250 mm at most. Thyristors 124 constitute electrode control circuits which are each independent together with the three top electrodes 118 and the three bottom electrodes opposed thereto, to control voltage and current. Under this construction, when the total capacity of furnace transformers is 60 MVA, each transformer controls an applied electric power in the range of 20 MVA, so in a steady state there are formed three arcs.

In a DC electric furnace of such a large-diameter bottom electrode type when all of the three bottom electrodes 130 cease to conduct due to the adhesion of slag to the electrodes, one of the top electrodes 118 is connected to an anode side to form arcs between the top electrodes, whereby the scraps in the furnace can be melted. In this case, although the scrap melting time becomes longer because of decrease of the applied electric power, it is possible to cope with the non-conduction of electric current relatively easily.

Figure 7:
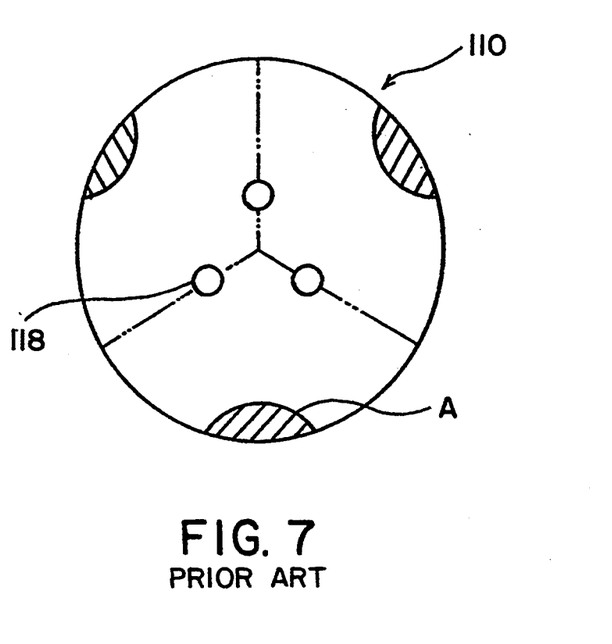
FIG. 7 is a schematic plan view of FIG. 6.

On the other hand, in the large-diameter electrode type shown in FIG. 6, since three top electrodes 118 are used as in the conventional AC electric furnaces, it is necessary to provide three systems with respect to all of electrode supporting arms, electrode lift devices and electrode control circuits, resulting in that the equipment is complicated and the equipment cost and maintenance cost are increased inevitably. Moreover, as shown in FIG. 7, since the positions of the three top electrodes 118 in a furnace body 110 are asymmetric with respect to the furnace wall, cold and hot spots are formed on the furnace wall, thus impeding uniform melting of the scraps. Further, a small ceiling 112a of the furnace wall 112 is damaged in an extremely early stage due to radiant heat or arcs. Additionally, since there occurs an unmelted scrap portion A in each cold spot, an extra electric power is required to melt the unmelted portion A, with the result that the required time from tap to tap in withdrawing molten steel from the furnace is extended and, so the unit consumption of each of electric power, electrodes and refractory is increased, thus leading to increase of the cost.

Another background art will be described below.

Figure 8:
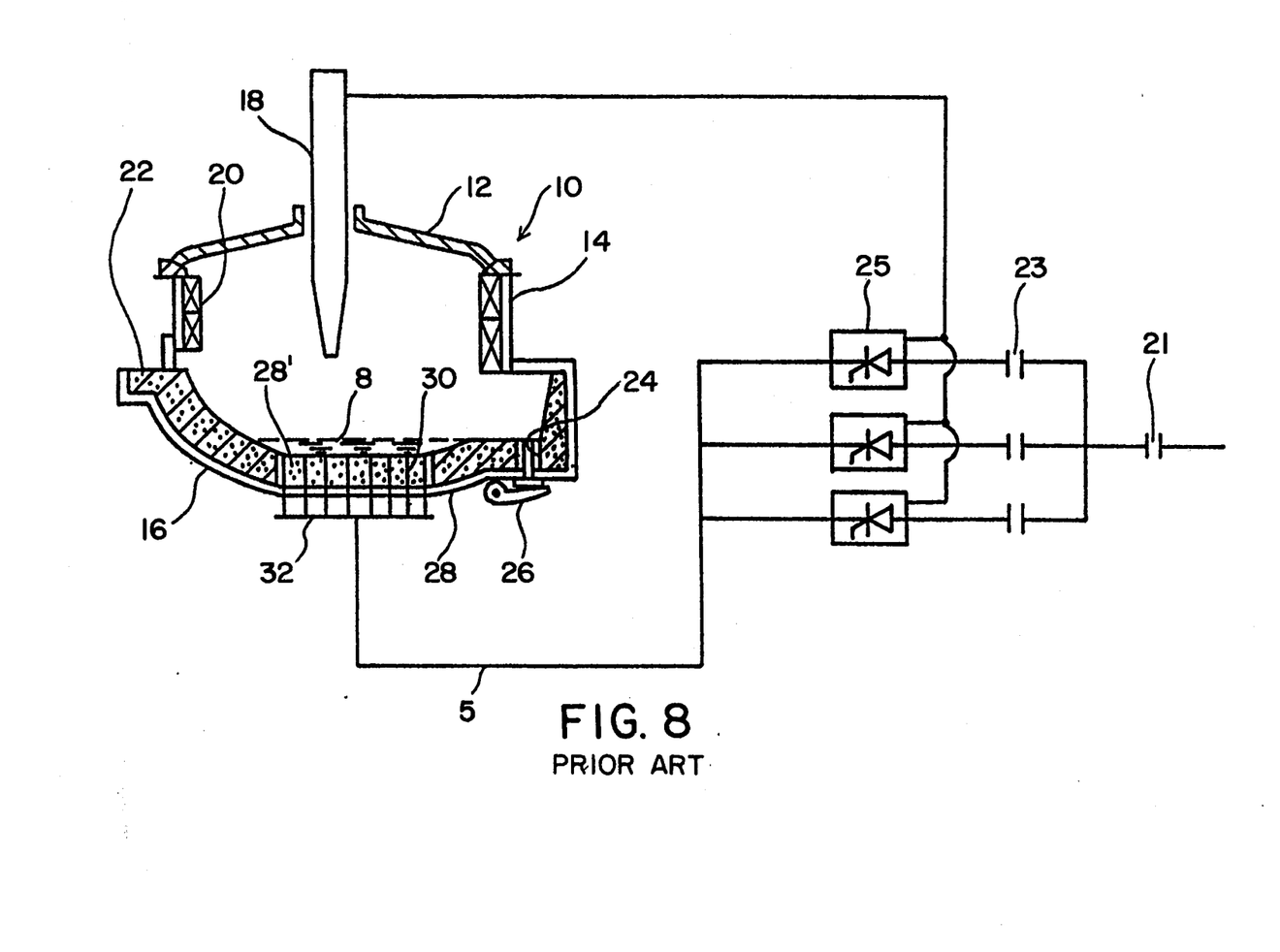
FIG. 8 is a schematic sectional view showing an entire arrangement of another conventional direct current electric furnace.

FIG. 8 is a schematic sectional view of a conventional DC electric furnace of a small-diameter multi-electrode air-cooled type. A further body 10 of this furnace is composed of a furnace lid 12, a furnace wall 14 and a furnace bottom 16. One (two or three as case may be) graphite electrode 18 is inserted into the furnace body through the furnace wall 12, and a water cooling panel 20 is attached to the furnace wall 14. In one end portion of the furnace bottom 16 there is formed a tapping hole 24 for molten steel after refining, while in an opposite end portion of the furnace bottom there is formed a slag-off hole 22 for the discharge of slag. Further, a large number of furnace bottom electrodes 30 each constituted by a steel rod of a small diameter are embedded in the furnace bottom 16, and the furnace body 10 can be tilted right and left by a tilting device (not shown) such as a hydraulic cylinder for example. A tap flap 26 for blockading the tapping hole 24 is disposed for opening and closing motions just under the hole 24.

As the bottom electrodes 30 which are a large number of small-diameter electrodes embedded in the furnace bottom, for example in a furnace having a capacity of 130 t/heat, a large number (200 or so) of round steel rods each about 40 mm in diameter are embedded upright in a refractory 28' lined by stamp on the furnace bottom 16. The bottom electrodes 30 form an anode in an electrode circuit, while the graphite electrode 18 projecting from the furnace lid 12 is opposed as a cathode to the anode. In this case, a maximum diameter of each bottom electrode 30 is about 40 mm.

Figure 9:
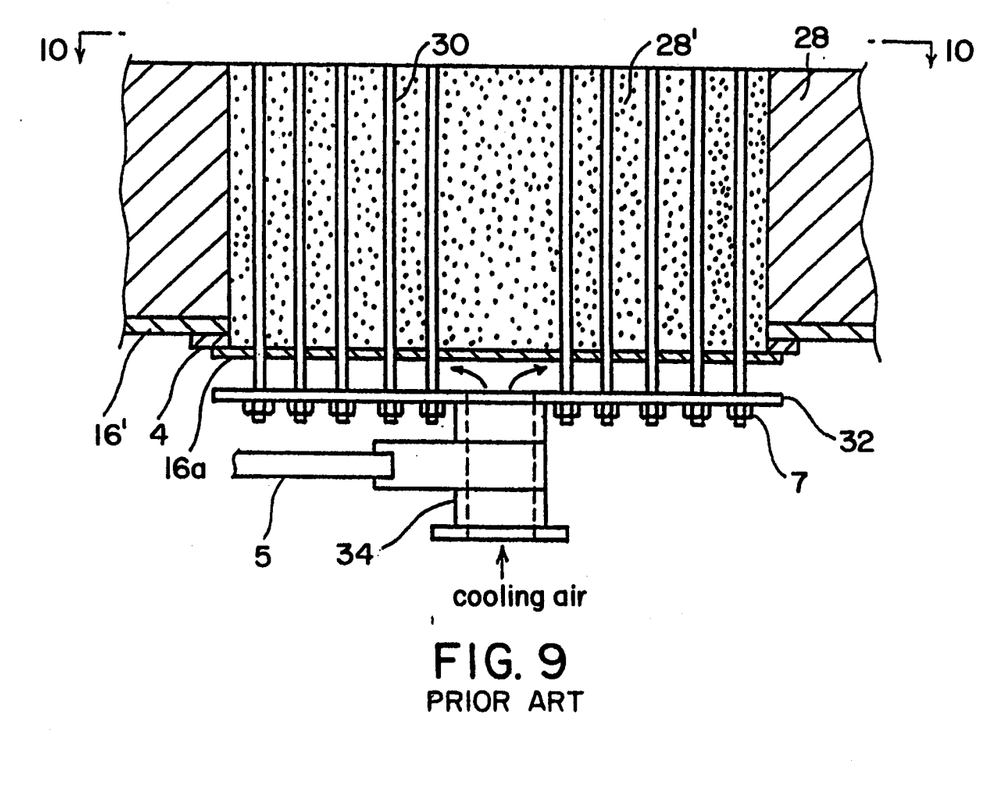
FIG. 9 is a sectional view showing furnace bottom electrodes used in the conventional direct current electric furnace illustrated in FIG. 8.
Figure 10:
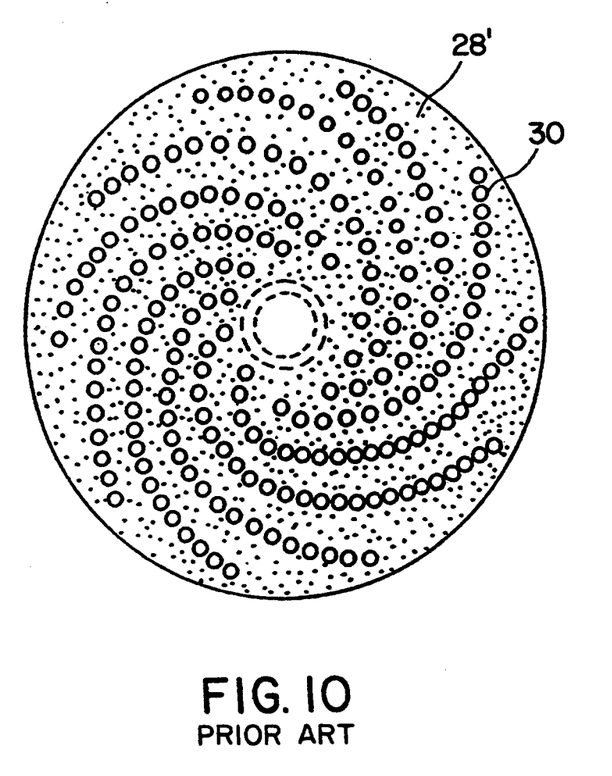
FIG. 10 is a plan view taken on line A—A in FIG. 9.

As shown in FIGS. 9 and 10, the stamp material 28' is stamped around the bottom electrodes 30, and the upper end faces of the electrodes 30 are exposed to the upper surface of the stamp material 28' while the lower ends thereof reach an electrode supporting plate 32 projecting to the exterior of the furnace and spaced from a bottom plate 16a and is fixed with clamping nuts 7. Cooling air is supplied between the electrode supporting plate 32 and the bottom plate 16a from a cooling air pipe 34 formed of an electroconductive material and connected to the electrode supporting plate 32, thereby cooling the lower portions of the bottom electrodes 30. Usually, the stamp material 28' on the bottom plate 16a and the cooling plate (electrode supporting plate) 32 are constituted integrally with the bottom electrodes 30 and these can be replaced as a block. The numeral 4 denotes an insulator for insulation between the bottom plate 16a and a furnace bottom shell 16', and the numeral 5 denotes a power supply cable, which is a water-cooled type. In a molten steel forming stage, an electric current is supplied along the following route: power supply cable 5→ cooling air pipe 34→ electrode supporting plate 32→ bottom electrodes 30→ molten steels scraps → top graphite electrode 18.

As shown in FIG. 8, electric power is supplied through a receiving transformer 21 in a power supply circuit and is fed to thyristors 25 after the voltage thereof is transformed to 200–800 V by transformers 23 for the furnace. The thyristors 25 are provided in a single system of an electrode control circuit which connect the top electrode 18 and the bottom electrodes 30 with each other, and thus the control of melting in the DC electric furnace is performed by a single system. Voltage control is performed by a positional control for the graphite electrode 18 through an electrode lift mechanism (not shown), while current control is performed by control of the thyristors 25.

Thus, because of a single graphite electrode 18, the construction around the top electrode is simple and the decrease in unit consumption of the graphite electrode 18 and in electric power unit consumption can be expected. Besides, control is easy because the control of melting in the DC electric furnace can be done by a single system.

In the DC electric furnace of an air cooling type shown in FIG. 8, having a large number of round steel rods as the bottom electrodes 30 embedded in the furnace bottom, for example when the furnace capacity is 130 t/heat, there are used about 200 such round steel rods each having a diameter of up to 40 mm or so. These many bottom electrodes 30 are embedded in the stamp refractory 28' and all of them are connected to a single electrode supporting plate 32 so that an electric current is supplied to all the bottom electrodes 30 at a time from a single power cable 5 from the electrode supporting plate 32. This DC electric furnace shown in FIG. 8 involves the following problems based on its construction and air cooling type.

(1) With repeated charge for melting and refining of scraps using direct current, the bottom electrodes of a small diameter are melted by both the heat from molten steel and Joule heat generated by the internal electric current, but because of an air-cooled type, not a water-cooled type, the heat removing ability is low and a limit is encountered in enlarging the diameter of the bottom electrodes. An upper limit of the diameter is 40 mm or so.

(2) It is impossible to make a fine electric current control for the bottom electrodes because electric power is supplied to a large number of bottom electrodes at a time.

(3) Slag is more likely to adhere to the upper portions of the electrodes because of a large number of the electrodes, and once electrodes cease to conduct an electric current, an excessive current flows through the other bottom electrodes in the case where the supply current is constant, resulting in that the furnace operation is badly influenced.

(4) Because the number of the bottom electrodes is too large it is actually impossible to monitor the melting condition of each electrode using a thermocouple.

(5) Due to correlation of the above problems (1)–(4) an average electric current density per bottom electrode is only about one half of that in the water cooling type and thus the efficiency is poor.

(6) Since the number of the bottom electrodes is large, it is only a stamp refractory that can be applied between the electrodes. Consequently, in comparison with the brick refractory, the rate of damage and wear is high and the service life of the bottom electrodes is short.

(7) The directionality of arcs generated in the furnace is influenced by a magnetic field created around the power cable which supplies an electric current to the electrodes. Since an electric current is fed to a large number of bottom electrodes simultaneously through a single power supply cable, the direction of arc is determined by the arrangement of the power supply system, so it is impossible to diminish hot and cold spots.

DISCLOSURE OF THE INVENTION

The present invention has been accomplished in view of the above-mentioned circumstances, and it is the first object of the invention to provide a direct current electric furnace for melting metal capable of melting scraps rapidly, diminishing cold and hot spots on the furnace wall and attaining cost-down.

It is the second object of the present invention to provide a direct current electric furnace capable of improving the electric current density of furnace bottom electrodes, preventing an excessive electric current caused by the adhesion of slag to the upper portions of the bottom electrodes to ensure the stability of arcing and thereby attaining a fine control for the bottom electrodes.

For achieving the first object mentioned above, the first direct current electric furnace for melting metal using direct current arcs according to the present invention is characterized by having one top electrode; a plurality of furnace bottom electrodes; and electric current controlling thyristor circuits for controlling electric currents flowing through the said plural furnace bottom electrodes each independently.

The first direct current electric furnace may be constructed so that there are used ammeters for measuring the values of the electric currents flowing through the plural furnace bottom electrodes, and the electric currents flowing through the plural bottom electrodes are controlled each independently by the electric current controlling thyristor circuits on the basis of the current values measured by the said ammeters.

In the first direct current electric furnace, in place of controlling the electric currents flowing through the plural furnace bottom electrodes each independently, the plural bottom electrodes may be divided into plural groups and an electric current control may be made for each group by means of electric current controlling thyristor circuits. In case where the plural furnace bottom electrodes are further divided into plural groups as just mentioned, there may be used ammeters for measuring the values of electric currents flowing through groups, and the electric currents flowing through those groups may be controlled each independently by the electric current controlling thyristor circuits on the basis of the current values measured by the ammeters.

For achieving the first and second objects mentioned above, the second direct current electric furnace for melting metal using direct current arcs according to the present invention is characterized by having one top electrode; a plurality of furnace bottom electrode units obtained by dividing a large number of furnace bottom electrodes; and electric current controlling thyristor circuits for controlling electric currents flowing through the said plural furnace bottom electrode units each independently.

Like the first direct current electric furnace, the second direct current electric furnace may be constructed so that there are used ammeters for measuring the values of the electric currents flowing through the plural electrode units, and the electric currents flowing through the plural electrode units are controlled each independently by the electric current controlling thyristor circuits on the basis of the current values measured by the said ammeters.

In the second direct current electric furnace, like the first direct current electric furnace, in place of controlling the electric currents flowing through the plural electrode units each independently, the plural electrodes units may be further divided into plural groups and an electric current control may be made for each group by means of electric current controlling thyristor circuits. In the case where the plural electrode units are further divided into plural groups as just mentioned, there may be used ammeters for measuring the values of electric currents flowing through those groups, and the electric currents flowing through those groups may be controlled each independently by the electric current controlling thyristor circuits on the basis of the current values measured by the ammeters.

In the second direct current electric furnace, it is desirable that the plural electrode units be assembled into an integral body for integral mounting and removal with respect to the furnace bottom.

In the second direct current electric furnace, it is not always necessary to divide the many furnace bottom electrodes into plural units. The electric currents flowing through the many furnace bottom electrodes may be supplied through plural routes using plural cables, and an electric current control may be made for each cable. In this case, there may be used ammeters for measuring the values of electric currents flowing through those cables, and the electric currents flowing through the cables may be controlled each independently by the electric current controlling thyristor circuits on the basis of the current values measured by the ammeters.

In the first and second direct current electric furnaces according to the present invention, there is attained a uniform heat load in the furnace interior because of a single top electrode; non-uniformity of the arcing direction caused by a magnetic field is diminished because of using only one power supply cable in the vicinity of the top electrode; and the electric current flowing through each of the furnace bottom electrodes, each of the plural electrode units or each of the groups described above is controlled finely by each electrode controlling thyristor circuit so as not to form an unmelted residue of metals whereby scraps can be melted uniformly and rapidly. Besides, the electric power unit consumption can be decreased and it is possible to prevent the formation of cold and hot spots. The required time from tap to tap is shortened and the service life of the furnace bottom electrodes is prolonged, whereby the productivity is improved and cost-down can be attained.

For controlling the electric current flowing through each furnace bottom electrode or each electrode unit or each group there may be conducted an open loop control so that an electric current value which has been preset experientially or experimentally is obtained. However, a finer electric current control can be attained by making construction so that the electric current flowing through each furnace bottom electrode or each electrode unit or each group is controlled on the basis of a electric current values measured by ammeters.

In the case where plural electrode units are used in the second direct current electric furnace according to the present invention, the electric current density is improved by a fine control for each electrode unit, so that it is possible to reduce the total number of furnace bottom electrodes and attain a compact construction as a whole. Also, an excessive current caused by the adhesion of slag to the upper portions of the furnace bottom electrodes can be prevented.

Further, in the case where the above plural electrode units are assembled into an integral body, it is possible to perform the bottom electrode replacing work more efficiently.

BEST MODE FOR PRACTICING THE INVENTION

A mode of embodiment of the first direct current electric furnace according to the present invention will first be described below.

Figure 1:
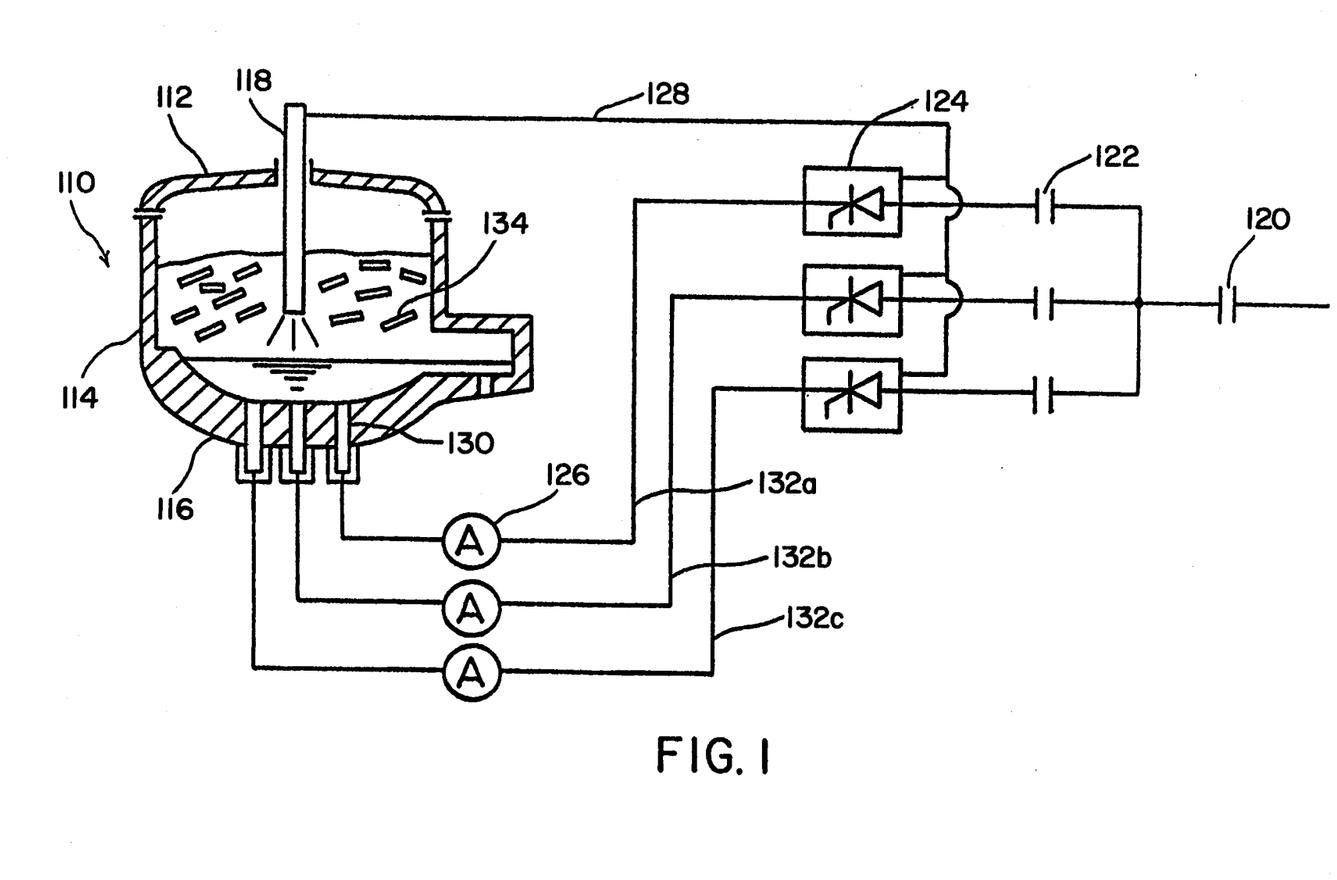
FIG. 1 is a schematic sectional view showing an entire arrangement relating to a mode of embodiment of the first direct current electric furnace according to the present invention.

FIG. 1 illustrates a mode of embodiment of the first direct current electric furnace according to the present invention, in which the same members as in the conventional electric furnace illustrated in FIG. 6 are indicated by the same reference numerals to simplify explanation.

A furnace body 110, like that in the conventional furnace (FIG. 6), is composed of a furnace lid 112, a furnace wall 114 and a furnace bottom 116, but a single top electrode 118 made of graphite is inserted into the furnace body through the furnace lid 112. In the furnace bottom 116, a plurality of water-cooled type furnace bottom electrodes 130 of a large diameter constituted by steel rods are embedded upright into a molded refractory. These plural furnace bottom electrodes 130 constitute anodes in electrode control circuits, while the single top electrode 118 projecting from the furnace lid 112 is opposed as a cathode to the bottom electrodes 130. The number of the furnace bottom electrodes is ten or so at most, but three is most preferable. The following description is now provided about the case where the number of the furnace bottom electrodes is three.

As in the foregoing conventional direct current electric furnace (see FIG. 6), electric power is supplied through a receiving transformer 120 in a power supply circuit, and after the voltage is transformed to 200-800 V by transformers 122 for the furnace, the electric power is fed to thyristors 124. A single top electrode 118 and the thyristors 124 which are arranged three side by side are connected together through a cable 128, while the three thyristors 124 and three furnace bottom electrodes 130 are connected together through three cables 132a, 132b and 132c, respectively, to constitute electrode control circuits. An ammeter 126 is provided in each of the cables 132a, 132b and 132c.

The operation of the furnace being considered will now be described. After scraps 134 are fed into the furnace body 110, electric power is supplied to the top electrode 118 through the cable 128 while an electric current is controlled by the thyristors 124. At the same time, the electric current and voltage fed between the top electrode 118 and the three furnace bottom electrodes 130 are adjusted while adjusting a vertical position of the top electrode 118. The scraps are melted by the resulting arcs. At this time, the values of electric currents flowing through the bottom electrodes 132a, 132b and 132c are measured by the ammeters 126 disposed in the cables 132a, 132b and 132c.

During melting of the scraps 134, there remains an unmelted residue of the scraps due to hanging or slip or due to non-uniformity of the arcing direction caused by a magnetic field created at the cables 128, 132a, 132b and 132c. In this embodiment, while the electric currents flowing through the three furnace bottom electrodes 130 are measured by the ammeters 126 respectively, a fine control is made for the amount of electric current by each thyristor 124 so as not to cause a local formation of an unmelted residue of the scraps, whereby uniform melting of the scraps is attained and the formation of cold and hot spots is diminished.

Although in this embodiment the electric currents flowing through the three furnace bottom electrodes 130 are controlled each independently using the ammeters 126 and the thyristors 124 which are provided in a corresponding relation to the bottom electrodes 130, the bottom electrodes 130 may be divided into say, two groups one of which comprises two bottom electrodes 130 and the other one bottom electrode 130, and the electric currents flowing through those electrodes may be controlled for each group. In this case, although the degree of freedom of control becomes lower than that in the case of controlling the electric currents flowing through the three furnace bottom electrodes 130 each independently, it is possible to attain the reduction of cost accordingly.

The reason why the number of the furnace bottom electrodes 130 is set to three is that in the case of a water-cooled type, if the diameter of each furnace bottom electrode is 250 mm, a maximum electric current per electrode is 40,000 A (amperes), and in a furnace capacity of 100 t/heat, the required 120,000 A is ensured by three such furnace bottom electrodes, whereby the electric current density per furnace bottom electrode 130 can be made low and hence the amount of each electrode melted is small, in other words, the service life of the bottom electrodes 130 is prolonged. Further, since there are used three furnace bottom electrodes 130, it is possible to disperse the chance of slag adhering to the upper portions of the electrodes and making the latter non-conductive.

The reason why the number of the top electrode is one is that according to the present technique the top electrode diameter of 711 is a maximum and in this case the maximum electric current is about 120,000 A, which can be coped with by three furnace bottom electrodes 130, whose total maximum electric current is 40,000 A$\times$3. Besides, the use of a single top electrode makes a heat load in the furnace uniform and permits uniform melting of the scraps easily. Further, since only one power supply cable is disposed near the top electrode, non-uniformity of the arcing direction caused by a magnetic field is reduced.

In the event an excessive electric current flows through one of the three furnace bottom electrodes during melting of the scraps, the electric currents in the whole system can be lowered simultaneously as an urgent countermeasure, although the electric current in only the furnace bottom electrode in which the excessive current is flowing may be reduced.

Next, a mode of embodiment of the second direct current electric furnace according to the present invention will be described below.

Figure 2:
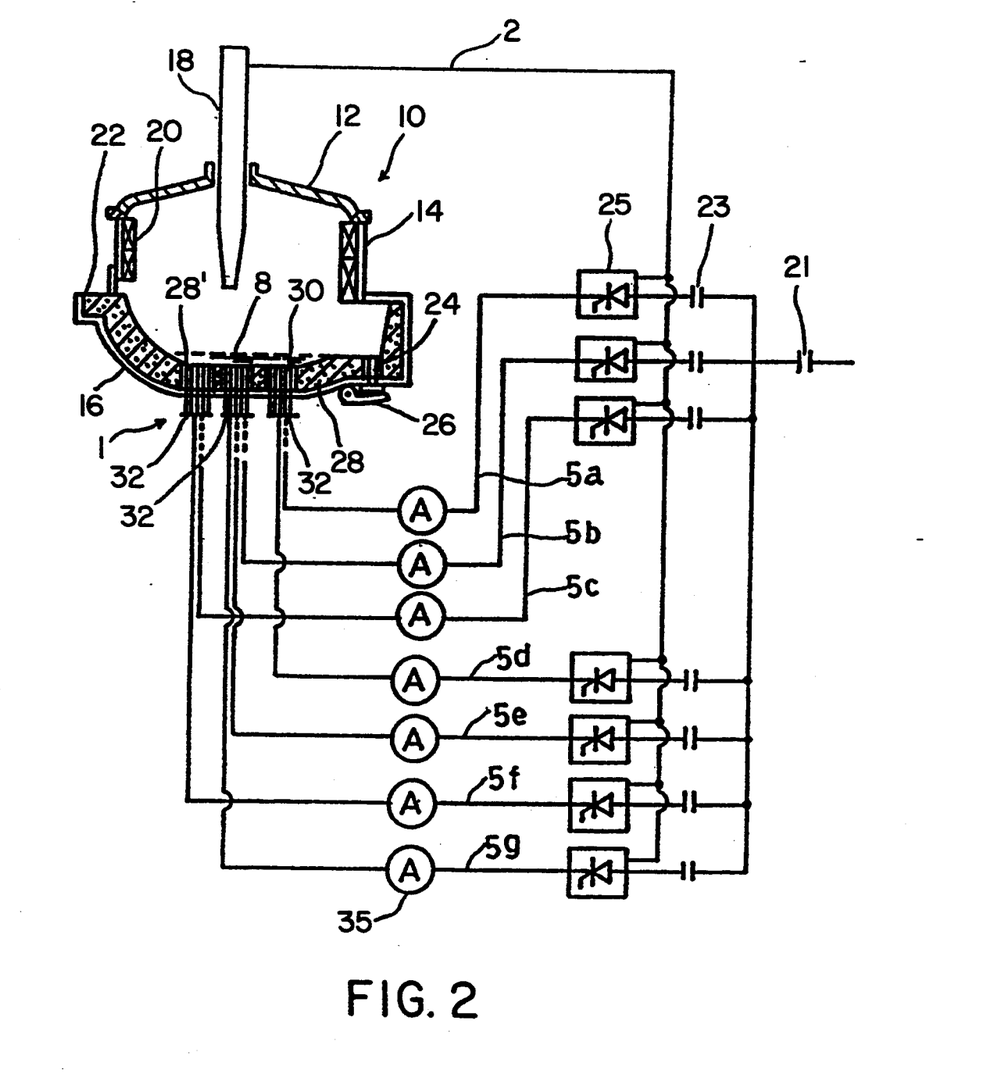
FIG. 2 is a schematic sectional view showing an entire arrangement relating to a mode of embodiment of the second direct current electric furnace according to the present invention.

FIG. 2 is a schematic sectional view of an air-cooled type direct current electric furnace relating to a mode of embodiment of the second direct current electric furnace according to the present invention, in which the same members as in the conventional direct current electric furnace illustrated in FIG. 8 are indicated by the same reference numerals to simplify explanation.

In a furnace bottom 16 there are embedded a large number of furnace bottom electrodes 30. The bottom electrodes 30 are grouped into plural electrode units 1 each consisting of plural such bottom electrodes, which electrode units 1 are embedded upright in a refractory 28' on the furnace bottom 16. The bottom electrodes 30 in the plural electrode units 1 constitute anodes in electrode circuits, and a graphite electrode 18 projecting downwards from a furnace lid 12 is opposed as a cathode to the said anode. Bottom plates 16a of the electrode units 1 are separated from one another and insulated by insulators 4.

Figure 3:
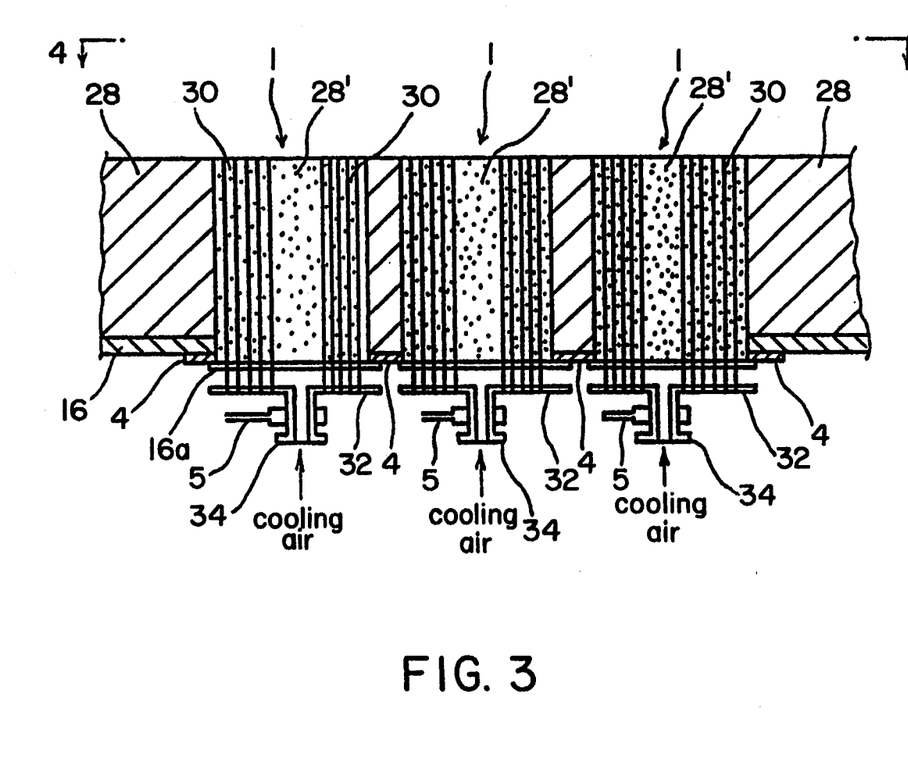
FIG. 3 is a sectional view showing furnace bottom electrodes used in the second direct current electric furnace illustrated in FIG. 2.
Figure 4:
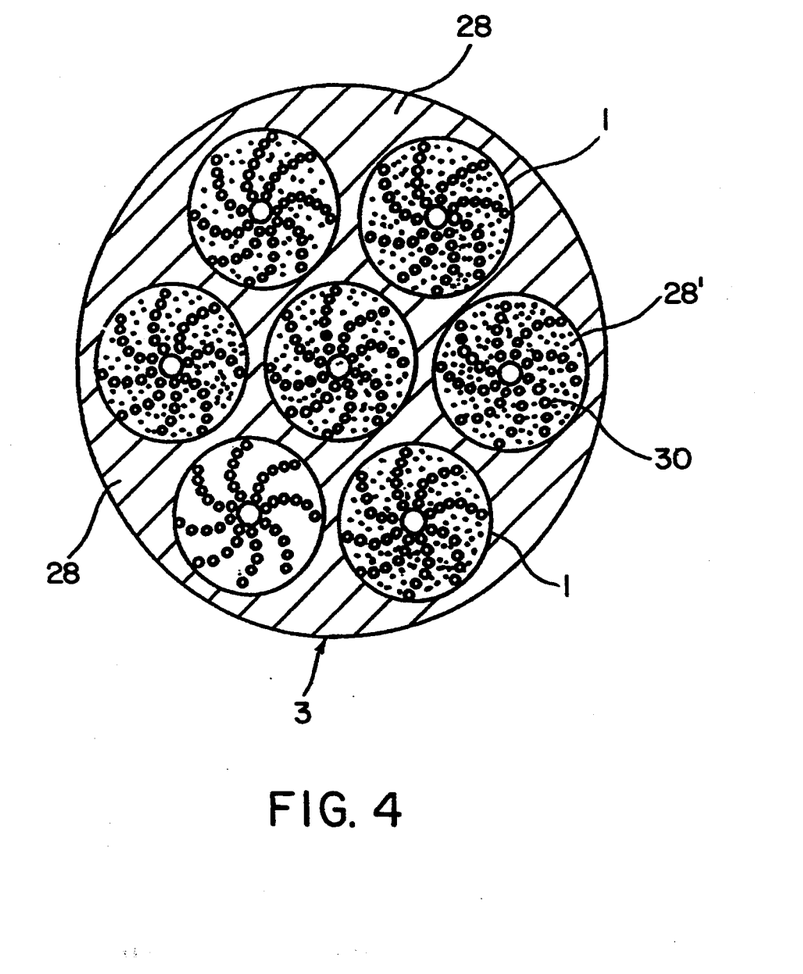
FIG. 4 is a plan view taken on line A—A in FIG. 3.

In the electrode units (seven units in this embodiment) each consisting of plural furnace bottom electrodes, as shown in FIGS. 3 and 4, a stamp refractory 28' is stamped around the bottom electrodes 30 in each electrode unit 1, and the upper ends of the bottom electrodes 30 are exposed to the upper surface of the stamp refractory 28' while the lower ends of the bottom electrodes 30 are projected from the bottom plates 16a to the exterior of the furnace and fixed to electrode supporting plates 32 which are spaced from the bottom plates 16a and correspond to the electrode units 1. The division of furnace bottom electrodes into plural electrode units is effective in an air-cooled direct current electric furnace having a capacity of 20 t/heat or more. The division into two or three electrode units is suitable if the furnace capacity is up to 60 t, while the division into three to seven electrode units is suitable if the furnace capacity exceeds 60 t.

The furnace bottom electrodes 30 in each electrode unit 1 are cooled by supplying air between each electrode supporting plate 32 and bottom plate 16a from a cooling air pipe 34 which is connected to the electrode supporting plate 32 and formed of an electroconductive material. Although the electrode units 1 may be embedded each independently into a furnace bottom refractory 28, it is preferable that the plural electrode units 1 be incorporated into the furnace bottom refractory 28 as an integral structure or a large block 3 (see FIG. 4) so that replacement can be made in the unit of the block. In a molten steel forming stage, an electric current is supplied along the following route: power supply cables 5a, 5b, . . . , 5g corresponding to the electrode units → cooling air pipes 34 → electrode supporting plates 32 → furnace bottom electrodes 30 → molten steel → scraps → graphite electrode 18.

As shown in FIG. 2, like the prior art (see FIG. 7), electric power is supplied through a receiving transformer 21 in a power supply circuit and is fed to thyristors 25 after the voltage thereof is transformed to 200–800 V by transformers 23 for the furnace. A single graphite electrode 18 and the thyristors 25 which are arranged seven side by side are connected together through a cable 2, while the seven thyristors 25 and the electrode supporting plates 32 of the seven electrode units 1 are connected together through the seven cables 5a, 5b, . . . , 5g, to constitute electrode control circuits. An ammeter 35 is provided in each of the cables 5a to 5g.

The operation of this electric furnace will now be described. After scraps are fed into a furnace body 10, electric power is supplied to the graphite electrode 18 through the cable 2 while an electric current is controlled by the thyristors 25. At the same time, the electric current and voltage fed between the graphite electrode 18 and the furnace bottom electrodes 30 in each electrode unit 1 are adjusted while adjusting a vertical position of the graphite electrode 18. The scraps are melted by the resulting arcs. At this time, the values of electric currents flowing through the bottom electrodes 30 are measured by the ammeters 35 disposed in the cables 5a to 5b.

During melting of the scraps, an unmelted residue of the scraps is apt to remain due to hanging or slip or due to non-uniformity of the arcing direction caused by a magnetic field created at the cables 2, 5a, 5b . . . , 5g. In this embodiment, while the electric currents flowing through the furnace bottom electrodes 30 in the seven electrode units 1 are measured by the ammeters 35, a fine control is made for the amount of electric current by each thyristor 24 so as not to cause a local formation of an unmelted residue of the scraps, whereby uniform melting of the scraps is attained and the formation of cold and hot spots is diminished.

As shown in FIG. 4, the number of the electrode units 7 is set to seven and this is for conforming to the furnace capacity of 130 t/heat. If the total electric current supplied is 120,000 amperes (A) and the electric current per electrode per electrode unit of furnace bottom electrodes 30 is 16,000 A, the number of bottom electrodes 30 is 200 and the electric current density is 40 A/cm² according to the prior art, while in the electrode units 1 divided in seven according to the present invention, the number of furnace bottom electrodes 30 per electrode unit can be reduced to 20. Consequently, the total number of bottom electrodes in decreased to 20×7=140 and the electric current density can be increased to 60 A/cm².

The reason why the number of furnace bottom electrodes can be decreased and the electric current density increased is that since an electric current control is made for each electrode unit, even if slag or the like adheres to the upper portions of furnace bottom electrodes, making the electrodes less conductive, it is possible to prevent an excessive current from flowing through other bottom electrodes and hence it is no longer necessary to use extra furnace bottom electrodes from the standpoint of safety.

As mentioned above, the arcing direction is influenced by the magnetic field created around the power supply cable 2 for the furnace bottom electrodes 30. In this connection, in the prior art, the arcing direction depends on the arrangement of a power supply system, while in the present invention, since the electric currents flowing through the furnace bottom electrodes are controlled independently for each electrode unit, it is possible to control the magnetic field in each system. As a result, the arcing direction is adjusted to a proper direction and this is particularly effective in accelerating the melting of an unmelted residue if any in the direct current electric furnace.

According to the mode of embodiment illustrated in FIGS. 2 to 4 there were obtained such results as shown in Table 1 below in comparison with the prior art.

TABLE 1

| Evaluation Items | Results according to the prior art | Results according to the present embodiment |
|---|---|---|
| Theoretically possible pin current density | 70A/cm² | 70A/cm² |
| Average current density in actual furnace | 40A/cm² (individual current control infeasible) | 60A/cm² (individual current control conducted) |
| Number of pins in 130 t/heat capacity furnace | 200 pins (φ42) | 140 pins (φ42) |
| Arc directionality control | Infeasible | Easy |
| Power unit consumption attained by arcing control | | −10 kWh/t as compared with the prior art |
| Equipment cost | | As compared with the prior art: +3% (electric equipment) −25% (mechanical equipment) |

Although in the mode of embodiment illustrated in FIGS. 2 to 4 the furnace is constructed to control the electric currents flowing through plural electrode units, construction may be made so that the plural electrode units 1 are further divided into, say, two or three groups and the electric currents flowing through the thus-divided electrode unit groups are controlled each individually.

Figure 5:
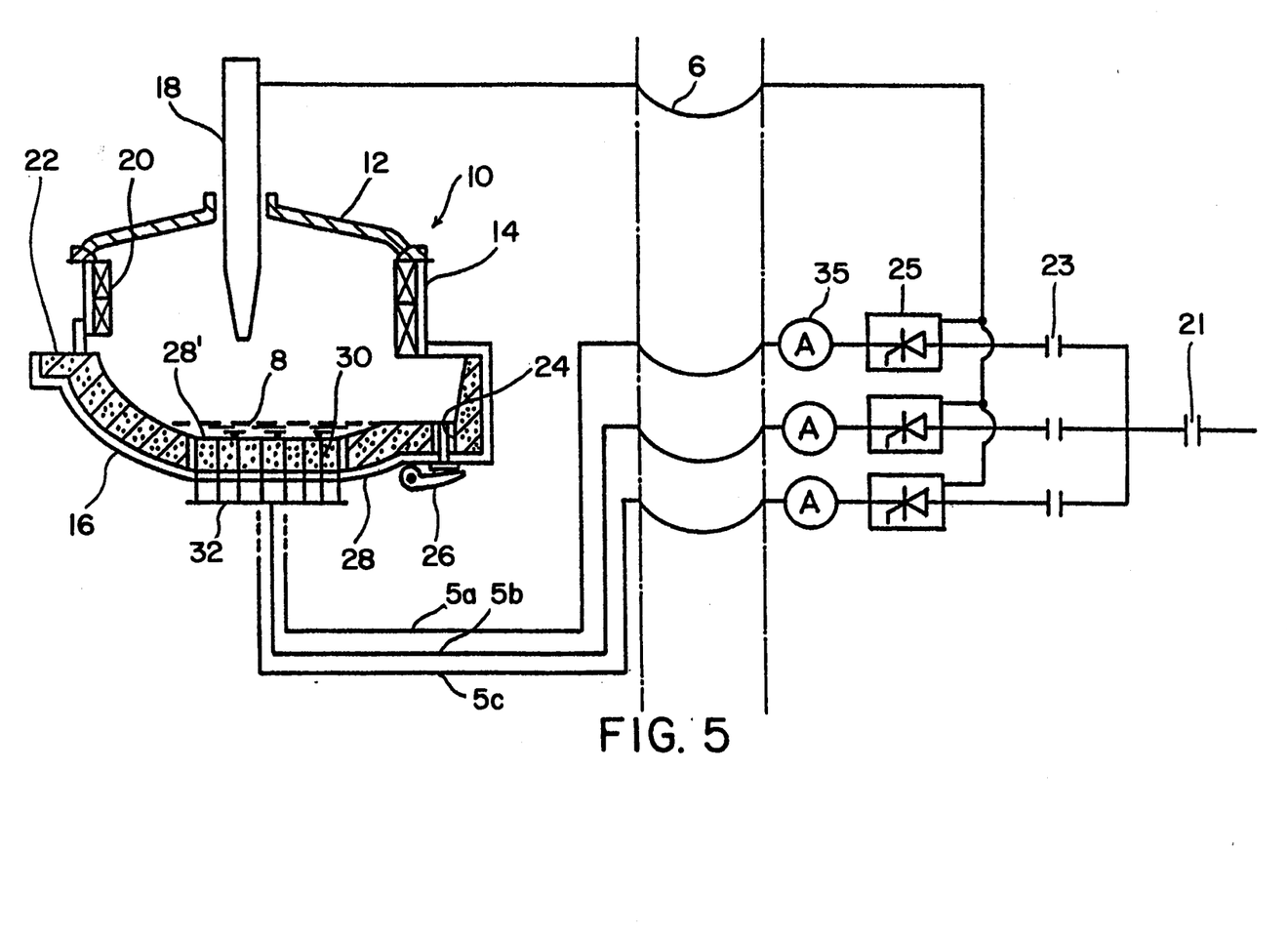
FIG. 5 is a schematic sectional view showing another mode of embodiment of the second direct current electric furnace according to the present invention.

FIG. 5 is a schematic view showing an entire arrangement relating to another mode of embodiment of the second direct current electric furnace according to the present invention, in which the same members as in the prior art illustrated in FIG. 8 are indicated by the same reference numerals to omit explanation.

In a furnace bottom 16 there are embedded a large number of furnace bottom electrodes 30 of a small diameter each constituted by steel rods, in such a form as illustrated in FIG. 10 for example. The electrodes are not constituted in such electrode unit form as shown in FIG. 4 relating to the previous embodiment (FIGS. 2–4). These many furnace bottom electrodes 30 of a small diameter are divided electrically into three groups so as to permit control of the arcing direction in the furnace, and for each group, an electric current flowing through the electrodes is monitored by an ammeter 35 and is controlled by a thyristor 25.

In FIG. 5, the members disposed on the right-hand side with respect to two dot-dash lines, namely, a receiving transformer 21, transformers 23 for the furnace thyristors 25 and ammeters 35, are arranged fixedly in an electric vault, while the portion on the left side of the two dot-dash line is constituted for integral tilting motion. Both portions are connected through a flexible cable 6.

In this mode of embodiment, as compared with the previous embodiment (FIGS. 2–4), the current density in the furnace bottom electrodes is about 40 amperes/cm$^2$ at most like that in the prior art (FIGS. 8–10) from the standpoint of safety. On the other hand, even in the case of a large capacity furnace, the furnace may be provided with a minimum number of cables and thyristors which permit the prevention of hot and cold spots even without dividing a large number of furnace bottom electrodes 30 into plural electrode units and providing thyristor circuits for controlling electric currents individually for each electrode unit.

We claim:

1. A direct current electric furnace for heating and melting an item, the furnace comprising:
   a furnace body having a top portion and a bottom surface for receiving the item;
   a single top electrode passing through and movably supported by the top portion of the furnace body;
   a plurality of bottom electrodes extending through the bottom surface of the furnace body and substantially symmetrically arranged relative to the single top electrode, each bottom electrode connected to a separate electrical power conductor; and
   an electric current controlling thyristor connected to each of the electrical power conductors for individually controlling an electric current flowing through the bottom electrode connected to the respective conductor thereby controlling a direction and distribution of direct current arcs between the top electrode and the plurality of bottom electrodes, wherein non-uniformity of thermal energy distribution in the furnace is reduced.

2. A direct current electric furnace according to claim 1, further comprising an ammeter connected to each of the conductors for measuring the electric currents flowing through the bottom electrodes, and wherein the electric current controlling thyristors control the electric currents flowing through the plural furnace bottom electrodes each individually on the basis of the electric current values measured by the ammeters, thereby controlling the direction of direct current arcs generated in the electric furnace.

3. A direct current electric furnace having a furnace body for melting metal using direct current arcs, including:
   a single top electrode passing through and movably supported by a top portion of the furnace body;
   a plurality of electrodes passing through a bottom surface of the furnace body; and
   electric current controlling thyristor circuits for controlling the electric currents flowing individually through the plurality of furnace bottom electrodes, through a plurality of routes using a plurality of cables, the electric current controlling thyristor circuits controlling the electric current in each route and a direction of direct current arcs in the furnace, wherein non-uniformity of thermal energy distribution in the furnace is reduced.

4. A direct current electric furnace for melting metal according to claim 3, further including ammeters for measuring the the electric currents flowing through the plural cables, and wherein the electric current controlling thyristor circuits control the electric currents flowing through the plural cables each individually on the basis of the electric current values measured by the ammeters, thereby controlling the direction of direct current arcs generated in the electric furnace.

5. A direct current electric furnace body having a top portion and a bottom surface for melting metal using direct current arcs, the furnace comprising:
   a single top electrode passing through and movably supported by the top portion of the furnace body;
   a plurality of electrode units obtained by dividing a multitude of electrodes passing through the bottom surface of the furnace body into plural units, the multitude of electrodes substantially symmetrically arranged relative to the single top electrode; and
   an electric current controlling thyristor circuit connected to each of the plurality of electrode units for individually controlling an electric current flowing through the plurality of electrode units to control a direction of direct current arcs in the furnace between the top electrode and the plurality of electrode units, wherein non-uniformity of thermal energy distribution in the furnace is reduced.

6. A direct current electric furnace for melting metal according to claim 5, further comprising an ammeter connected to each of the electric current controlling thyristor circuits for measuring the current flowing through the plurality of electrode units, wherein the electric current controlling thyristor circuits control the current through the respective electrode units on the basis of an electric current measured by the respective ammeter to control a direction of arcs between the top electrode and the plurality of bottom electrodes which controls the distribution of thermal energy in the furnace.

7. A direct current electric furnace having a furnace body for melting metal using direct current arcs, including:
   a single top electrode passing through and movably supported by a top portion of the furnace body;
   a plurality of electrode units obtained by dividing a multitude of bottom electrodes, passing through a bottom surface of the furnace body, into plural units; and
   electric current controlling thyristor circuits for controlling the electric currents flowing individually through the plural electrode units for each plural groups of the electrode units obtained by dividing the electrode units into the plural groups, wherein non-uniformity of thermal energy distribution in the furnace is reduced.

8. A direct current electric furnace for melting metal according to claim 7, further including ammeters for measuring the electric currents flowing through the plural groups of the electrode units, and wherein the electric current controlling thyristor circuits control the electric currents flowing through the plural groups of the electrode units each independently on the basis of the electric current measured by the ammeters, thereby controlling the direction of the direct current arcs generated in the electric furnace.

9. A direct current electric furnace for melting metal according to claim 5 wherein said plural electrode units are assembled into an integral structure.

10. A direct current electric furnace for melting metal according to claim 6, wherein said plural electrode units are assembled into an integral structure.

11. A direct current electric furnace for melting metal according to claim 7, wherein said plural electrode units are assembled into an integral structure.

12. A direct current electric furnace for melting metal according to claim 8, wherein said plural electrode units are assembled into an integral structure.

* * * * *